United States Patent
Dickinson et al.

(10) Patent No.: US 12,546,070 B2
(45) Date of Patent: *Feb. 10, 2026

(54) PORTABLE BARRICADE AND PORTABLE BARRICADE SYSTEM

(71) Applicant: DELTA SCIENTIFIC CORPORATION, Palmdale, CA (US)

(72) Inventors: Harry D. Dickinson, La Canada Flintridge, CA (US); David G. Dickinson, La Canada Flintridge, CA (US); James John Burnett, Canyon Country, CA (US); Judy L. Manor, Lancaster, CA (US)

(73) Assignee: DELTA SCIENTIFIC CORPORATION, Palmdale, CA (US)

(*) Notice: Subject to any disclaimer, the term of this patent is extended or adjusted under 35 U.S.C. 154(b) by 283 days.

This patent is subject to a terminal disclaimer.

(21) Appl. No.: 17/714,074

(22) Filed: Apr. 5, 2022

(65) Prior Publication Data

US 2022/0228330 A1 Jul. 21, 2022

Related U.S. Application Data

(62) Division of application No. 16/201,655, filed on Nov. 27, 2018, now Pat. No. 11,384,493.

(51) Int. Cl.
*E01F 13/04* (2006.01)
*B60P 1/02* (2006.01)
(Continued)

(52) U.S. Cl.
CPC .............. *E01F 13/048* (2013.01); *B60P 1/02* (2013.01); *E01F 13/12* (2013.01); *E05F 15/00* (2013.01);
(Continued)

(58) Field of Classification Search
None
See application file for complete search history.

(56) References Cited

U.S. PATENT DOCUMENTS 353,368 A * 11/1886 Miller ................... B61L 29/026
49/93
484,572 A * 10/1892 Rudert .................... E05F 13/04
49/34
(Continued)

FOREIGN PATENT DOCUMENTS

FR 2812311 A1 * 2/2002 ............... B66F 3/35
FR 3029219 A1 * 6/2016
(Continued)

OTHER PUBLICATIONS

"G-4033P Portable Drop Arm—M30 P3 Certified"; YouTube video from Gibraltar Perimeter Security; Jul. 12, 2017 web link: https://www.youtube.com/watch?v=vKmcnK7lxpc (Year: 2017).*
(Continued)

*Primary Examiner* — Christopher J Sebesta
*Assistant Examiner* — Katherine J Chu
(74) *Attorney, Agent, or Firm* — Womble Bond Dickinson (US) LLP

(57) ABSTRACT

A portable barricade includes a road plate, first and second support posts extending upward from end portions of the road plate, a barricade arm extending between the first and second support posts, and a lift coupled one of the end portions of the barricade arm and a corresponding one of the first and second support posts. Actuation of the lift is configured to slide the barricade arm relative to the first and second support members between a retracted position proximate to the road plate and a deployed position distal from the road plate.

18 Claims, 10 Drawing Sheets

(51) Int. Cl.
  *E01F 13/12* (2006.01)
  *E05F 15/00* (2015.01)
  *E05F 15/57* (2015.01)
  *E05F 15/60* (2015.01)

(52) U.S. Cl.
  CPC .............. *E05F 15/57* (2015.01); *E05F 15/60* (2015.01); *E05Y 2900/40* (2013.01)

(56) References Cited

U.S. PATENT DOCUMENTS

| | | | | |
|---|---|---|---|---|
| 1,530,056 A * | 3/1925 | Pace | ................... | B61L 29/02 |
| | | | | 49/257 |
| 1,699,545 A * | 1/1929 | Sawyer | ................ | E01F 13/048 |
| | | | | 49/9 |
| 4,318,079 A | 3/1982 | Dickinson | | |
| 4,354,771 A | 10/1982 | Dickinson | | |
| 4,844,653 A | 7/1989 | Dickinson | | |
| RE33,201 E | 4/1990 | Dickinson | | |
| 5,007,763 A * | 4/1991 | Burgett | ................ | E01F 15/006 |
| | | | | 404/9 |
| 5,118,056 A * | 6/1992 | Jeanise | ................ | E01F 13/048 |
| | | | | 246/111 |
| 5,271,183 A * | 12/1993 | Hahn | ................... | E05F 15/665 |
| | | | | 49/73.1 |
| 5,466,088 A * | 11/1995 | Nasatka | ................ | E01F 13/08 |
| | | | | 404/6 |
| 5,560,733 A | 10/1996 | Dickinson | | |
| 6,189,839 B1 * | 2/2001 | Lemieux | ................ | E01F 9/696 |
| | | | | 246/127 |
| 6,349,503 B1 * | 2/2002 | Gompertz | ............ | E01F 13/028 |
| | | | | 49/34 |
| 6,382,869 B1 | 5/2002 | Dickinson | | |
| 6,485,225 B1 * | 11/2002 | Baker | ................... | E01F 13/048 |
| | | | | 49/34 |
| 6,845,589 B1 * | 1/2005 | Thompson | ........... | E01F 13/028 |
| | | | | 49/34 |
| 7,037,028 B1 * | 5/2006 | Donohoe | .............. | E01F 13/048 |
| | | | | 404/6 |
| 7,329,067 B1 * | 2/2008 | Rodriguez | ............ | E01F 13/046 |
| | | | | 404/6 |
| 7,441,817 B1 * | 10/2008 | Unrath, Sr. | ............... | F16F 7/12 |
| | | | | 293/118 |
| 7,775,738 B2 * | 8/2010 | Darcy | ..................... | E01F 13/12 |
| | | | | 404/6 |
| 7,862,252 B2 * | 1/2011 | Gelfand | ................ | E01F 13/123 |
| | | | | 404/9 |
| 8,033,053 B2 * | 10/2011 | Anderson | ............. | E01F 13/048 |
| | | | | 404/6 |
| 8,267,380 B1 * | 9/2012 | Dormeville | ........... | E01F 13/048 |
| | | | | 256/22 |
| 8,496,395 B2 * | 7/2013 | Miracle | ................ | E01F 15/085 |
| | | | | 404/6 |
| 8,734,046 B2 * | 5/2014 | Miracle | ................ | E01F 13/048 |
| | | | | 404/6 |
| 8,740,241 B2 * | 6/2014 | Groeneweg | ............ | F41H 11/12 |
| | | | | 280/411.1 |
| 8,985,890 B2 * | 3/2015 | Miracle | ................ | E01F 13/123 |
| | | | | 404/6 |
| 9,212,521 B2 * | 12/2015 | McCarty | .................. | E05F 15/73 |
| 9,315,956 B2 * | 4/2016 | Heald | ................... | E01F 13/048 |
| 9,410,298 B2 * | 8/2016 | Kemper | .................. | E01F 13/12 |
| 10,612,200 B2 * | 4/2020 | Bock, II | .................. | E01F 13/12 |
| 10,900,181 B2 * | 1/2021 | Neusch | .................... | E01F 13/12 |
| 2004/0028469 A1 * | 2/2004 | Dehart | .................. | E01F 15/085 |
| | | | | 404/6 |
| 2006/0233607 A1 * | 10/2006 | Buckley | ................ | E01F 13/048 |
| | | | | 404/6 |
| 2009/0311044 A1 * | 12/2009 | Groeneweg | ........... | E01F 15/088 |
| | | | | 404/6 |
| 2013/0189030 A1 * | 7/2013 | Miracle | ................. | E01F 13/048 |
| | | | | 404/6 |
| 2016/0053449 A1 * | 2/2016 | Kemper | .................. | E01F 13/12 |
| | | | | 404/6 |
| 2020/0217026 A1 * | 7/2020 | Briehl | ..................... | E01F 13/12 |

FOREIGN PATENT DOCUMENTS

| | | | | |
|---|---|---|---|---|
| FR | 3080865 A1 * | 11/2019 | ............ | E01F 13/046 |
| GB | 1275559 A * | 5/1972 | | |
| WO | WO-2007011197 A1 * | 1/2007 | ............ | E01F 13/048 |

OTHER PUBLICATIONS

Gibraltar Perimeter Security "Anti-Ram Drop Arm" website pages, https://www.gibraltarperimetersecurity.com/wp-content/uploads/G-4000-Series-Anti-Ram-Drop-Arms-01.13.20.pdf, 2 pages.

Gibraltar Perimeter Security "Portable Drop Arm" website pages, https://www.gibraltarperimetersecurity.com/wp-content/uploads/G-4033P-Portable-Drop-Arm-Cut-Sheet-01.13.20.pdf, 2 pages.

Gibraltar Perimeter Security "G-4000 Series Drop Arms" website pages, https://www.gibraltarperimetersecurity.com/drop-arms-barriers/, 4 pages.

Gibraltar Perimeter Security, "G-4033P Portable Drop Arm—M30 P3 Certified", Jul. 12, 2017, YouTube: https://www.youtube.com/watch?v=vKmonK7lxpc, (Year: 2017).

Gibraltar Perimeter Security, "Gibraltar—The Power of Innovation", Apr. 6, 2018, YouTube: https://www.youtube.com/watch?v=WKvmglo8hKs, (Year: 2018).

Gibraltar Perimeter Security, "G-4033P Portable Drop Arm—M30 P3 Certified", Jul. 12, 2017, YouTube: https://www.youtube.com/watch?v=vKmcnK7lxpc, screen grab of video at 0:01 into the video (Year: 2017).

Gibraltar Perimeter Security, "G-4033P Portable Drop Arm—M30 P3 Certified", Jul. 12, 2017, YouTube: https://www.youtube.com/watch?v=vKmcnK7lxpc, screen grab of video at 0:02 into the video (Year: 2017).

* cited by examiner

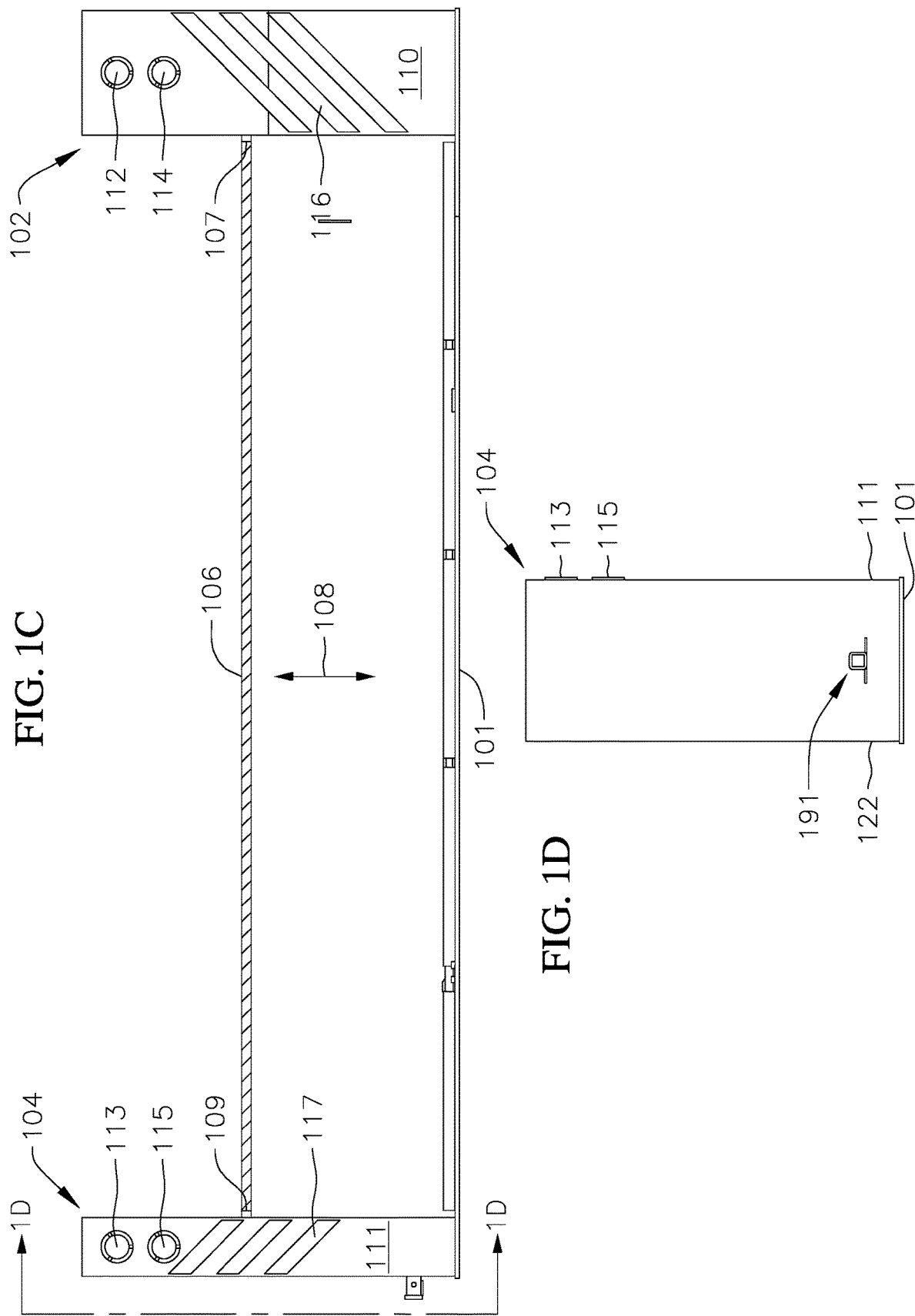

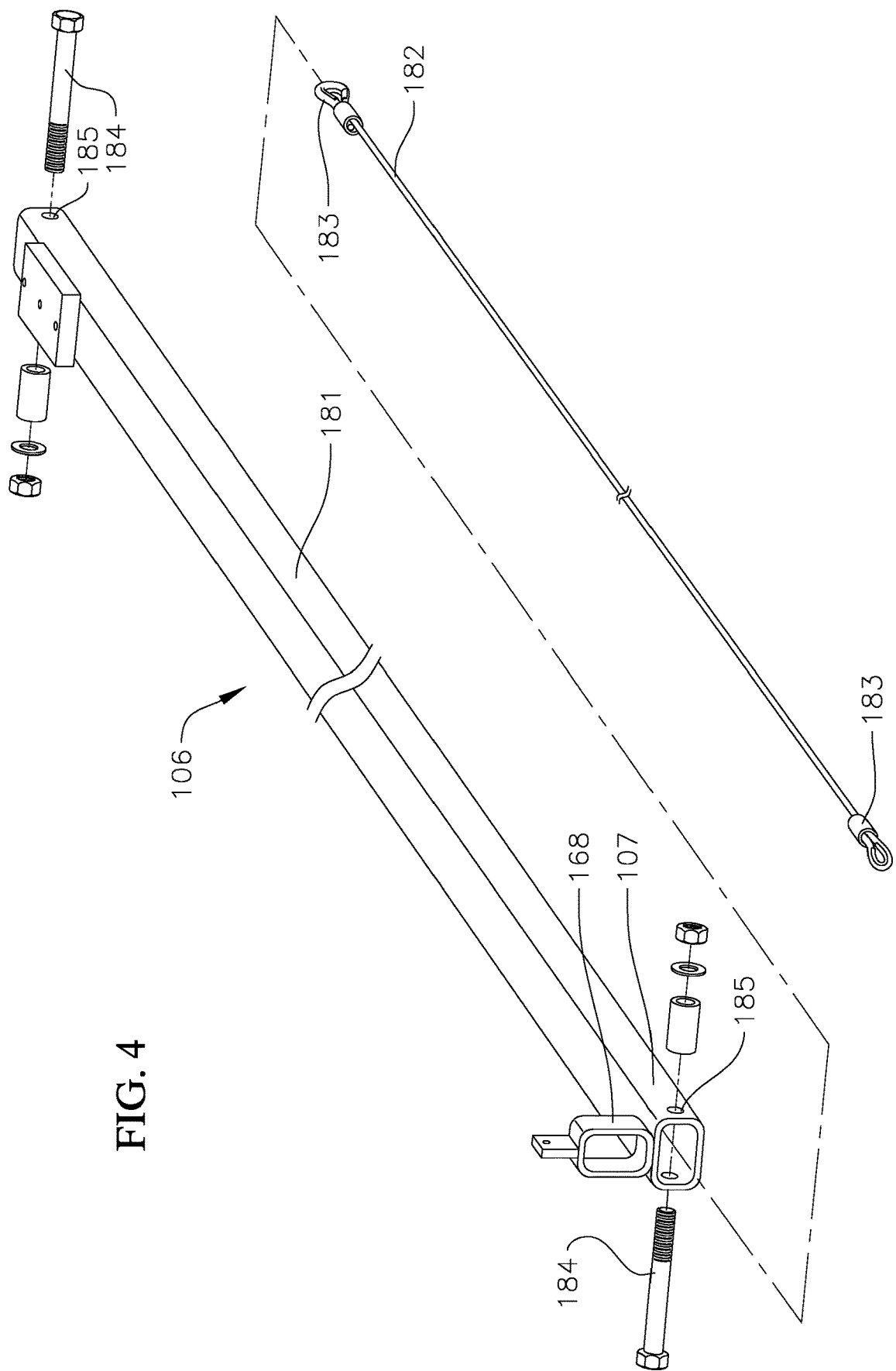

PORTABLE BARRICADE AND PORTABLE BARRICADE SYSTEM

CROSS REFERENCE TO RELATED APPLICATION

This application is a divisional of U.S. patent application Ser. No. 16/201,655, filed Nov. 27, 2018, and issued as U.S. Pat. No. 11,384,493, the contents of which are hereby incorporated by reference in its entirety.

FIELD

The present disclosure relates generally to portable barricades and portable barricade systems.

BACKGROUND

Barricades are commonly deployed to protect individuals and/or property against attack by a vehicle, such as a truck bomb attack. However, conventional barricades such as walls, fences, and concrete highway barriers (e.g., so-called "Jersey barriers") are unsuitable for preventing an attacking vehicle in a 90-degree impact. Some conventional barricades suitable for stopping an attacking vehicle must be cast in place with a deep foundation or secured to a roadway surface. However, excavation or attachment to the roadway surface is both costly and time-consuming, which inhibits rapid deployment of the barricade. Additionally, conventional barricades commonly rely upon the mass of the barricade to stop an attacking vehicle, and thus conventional barricades must be very heavy to stop larger vehicles, such as trucks, which increases the cost of these conventional barricades and limits their portability.

SUMMARY

The present disclosure is directed to various embodiments of a portable barricade. In one embodiment, the portable barricade includes a road plate, a first support post extending upward from a first end portion of the road plate, a second support post extending upward from a second end portion of the road plate opposite the first end portion, and a barricade arm extending between the first and second support posts. The barricade arm has a first end portion slidably coupled to the first support post and a second end portion slidably coupled to the second support post. The portable barricade also includes a lift coupled one of the first and second end portions of the barricade arm and a corresponding one of the first and second support posts. Actuation of the lift is configured to slide the barricade arm relative to the first and second support posts between a retracted position proximate to the road plate and a deployed position distal from the road plate.

A center of gravity of each of the first and second support posts may be above a midpoint of the first and second posts and/or rearward of a fore and aft centerline of the first and second posts.

The barricade arm may be a beam, a rod, and/or a cable.

The portable barricade may include a trailer hitch receiver coupled to one of the first and second support posts.

The lift mechanism may include a rail, a carriage coupled to the one of the first and second end portions of the barricade arm and configured to slide along the rail, and an actuator coupled to the carriage. The actuator is configured to slide the carriage along the rail and move the barricade arm between the retracted and deployed positions.

The actuator may be a cylinder, such as a hydraulic cylinder, a pneumatic cylinder, or an electromechanical cylinder.

The lift mechanism may include a roller coupled to an end of the cylinder and a tensile member having a first end coupled to the carriage, a second end coupled to the corresponding one of the first and second support posts, and intermediate portion extending over the roller.

The roller may include a pair of sprockets and the tensile members my include a pair of chains.

The portable barricade may include a counter-weight assembly coupled to the other of the first and second end portions of the barricade arm.

The counter-weight assembly may include at least one pulley coupled to the other of the first and second support posts, a guide defining a channel, a counter-weight slidably received in the channel, and a tensile member having a first end coupled to the other of the first and second end portions of the barricade arm, a second end coupled to the counter-weight, and an intermediate portion extending over the at least one pulley.

The barricade arm may be substantially parallel to the road plate.

The barricade arm may be longitudinally offset from a center of each of the first and second support posts.

The present disclosure is also directed to various embodiments of a portable barricade system including a portable barricade and a trailer configured to be coupled to the portable barricade. The portable barricade includes a road plate, a first support post extending upward from a first end portion of the road plate, a second support post extending upward from a second end portion of the road plate opposite the first end portion, and a barricade arm extending between the first and second support posts. The barricade arm has a first end portion slidably coupled to the first support post and a second end portion slidably coupled to the second support post. The portable barricade also includes a lift coupled one of the first and second end portions of the barricade arm and a corresponding one of the first and second support posts.

The trailer may include a frame, a pair of wheels rotatably coupled to the frame, and a hoist assembly coupled to the frame. The hoist assembly is configured to raise the portable barricade off of the ground.

The hoist assembly may include at least one support member coupled to the frame, a swing arm rotatably coupled to the at least one support member, and an actuator coupled to the swing arm.

The road plate of the portable barricade may include a series of trailer attachment brackets and a hoist point.

The portable barricade may include a trailer hitch receiver coupled to one of the first and second support posts.

A portable barricade according to another embodiment of the present disclosure includes a road plate, a first support post extending upward from a first end portion of the road plate, a second support post extending upward from a second end portion of the road plate opposite the first end portion, and a barricade arm extending between the first and second support posts. The barricade arm has a first end portion slidably coupled to the first support post and a second end portion slidably coupled to the second support post. The portable barricade also includes a lift coupled one of the first and second end portions of the barricade arm and a corresponding one of the first and second support posts, and a counter-weight assembly coupled to the other of the first and second end portions of the barricade arm. Actuation of the lift is configured to slide the barricade arm relative to the first and second support posts between a retracted position proximate to the road plate and a deployed position distal from the road plate, and the counter-weight assembly is configured to aid in lifting the other of the first and second end portion of the barricade arm when the lift is actuated.

The counter-weight assembly may include at least one pulley, at least one counter-weight, and a tensile member having a first end coupled to the barricade arm, a second end coupled to the counter-weight, and an intermediate portion extending over the at least one pulley.

The present disclosure is also directed to various embodiments of a method of arresting a forward motion of a vehicle travelling on a surface. In one embodiment, the method includes contacting an undercarriage of the vehicle during the forward motion of the vehicle, which lifts at least a forward end of the vehicle off of the surface.

The method may also include severing a drive shaft of the vehicle during the forward motion of the vehicle.

The contacting of the undercarriage of the vehicle may include contacting the undercarriage with a road plate of a portable barricade.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1A-1D are a front perspective view, a rear perspective view, a front view, and a side view, respectively, of a portable barricade according to one embodiment of the present disclosure, which includes a road plate, first and second support posts coupled to opposite ends of the road plate, and a barricade arm extending between the first and second support posts;

FIG. 4 is an exploded perspective view of the embodiment of the barricade arm illustrated in FIGS. 1A-1D.

DETAILED DESCRIPTION

Figure 1A:
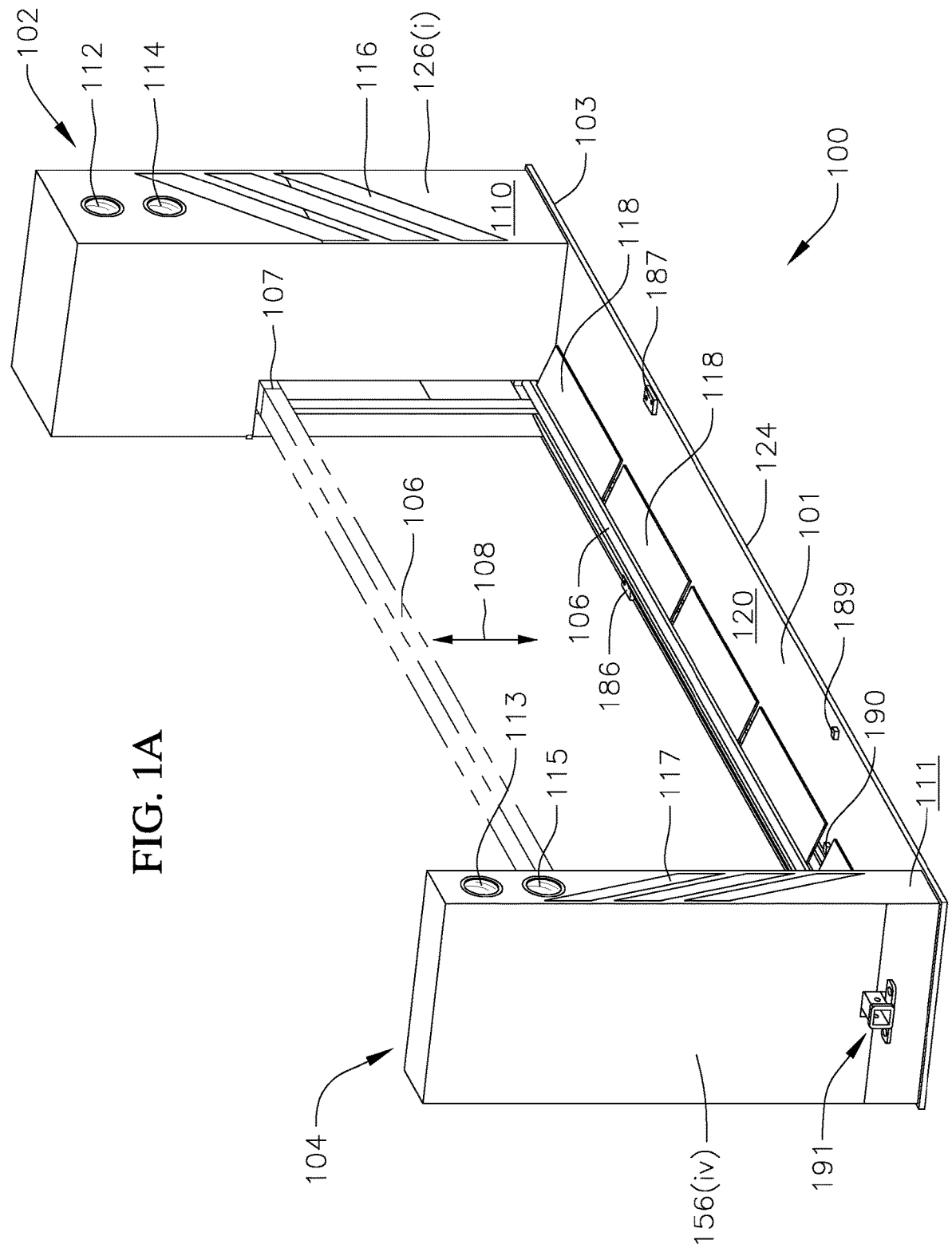

The present disclosure is directed to various embodiments of a portable barricade. The portable barricades according to various embodiments of the present disclosure include a barricade arm, which is connected at opposite ends to a pair of support posts, that may be rapidly deployed (e.g., in under 2 seconds) into a raised position. The portable barricades of the present disclosure are configured to arrest the forward motion of a vehicle (e.g., an automobile or a truck) to protect individuals and/or property against attack by a truck bomb, for instance. The portable barricade of the present disclosure are lightweight and may be rapidly deployed along streets, entrances, or any other wide expanse in which it is desired to protect individuals and/or property against the threat of a vehicle attack. The portable barricades according to one or more embodiments of the present disclosure are configured to arrest the forward motion of a vehicle by rotating over (e.g., tipping over) when the raised barricade arm of the portable barricade is contacted by the vehicle. Rotation of the portable barricade caused by contact between the vehicle and the raised barricade arm causes a road plate, over which the vehicle passes, to rotate and contact undercarriage of the vehicle. The contact between the road plate and the undercarriage of the vehicle is configured to lift a front end of the vehicle off of the ground and/or disable or at least damage the vehicle (e.g., depending on the type of vehicle and the approach speed of the vehicle, the rotation of the portable barricade may cause the road plate to sever the drive shaft of the vehicle). The present disclosure is also directed to various embodiments of a portable barricade system including a trailer for transporting the portable barricade.

With reference now to FIGS. 1A-1D, a portable barricade 100 according to one embodiment of the present disclosure includes a road plate 101 configured to be supported on the ground (e.g., a concrete, asphalt, or compressed soil roadway), a first support post 102 coupled to a first end portion 103 of the road plate 101, a second support post 104 coupled to a second end portion 105 of the road plate 101 opposite the first end portion 103, and a barricade arm 106 extending between the first and second support posts 102, 104. The barricade arm 106 includes a first end portion 107 slidably (arrow 108) coupled to the first support post 102 and a second end portion 109 opposite the first end portion 107 slidably coupled to the second support post 104. The barricade arm 106 is configured to slide relative to the first and second support posts 102, 104 between a retracted (e.g., stowed) position proximate to the road plate 101 (e.g., on the road plate 101 or spaced close to the road plate 101) and a deployed (e.g., raised) position (shown in dashed lines in FIGS. 1A-1B and solid lines in FIG. 1C) distal from the road plate 101. When the barricade arm 106 is in the retracted position, the portable barricade 100 is configured to permit a vehicle to pass between the first and second support posts 102, 104 and over the road plate 101. When the barricade arm 106 is in the deployed position, the portable barricade 100 is configured to arrest the forward motion of a vehicle attempting to pass between the first and second support posts 102, 104. In the illustrated embodiment, the end portions 107, 109 of the barricade arm 106 remain connected to the first and second support posts 102, 104 as the barricade arm 106 moves between the retracted and deployed positions, and therefore the portable barricade 100 of the present disclosure is more secure than a conventional swing type barricade in which the barricade arm is unlatched as the barricade arm rotates from the open position to the closed position (i.e., the barricade arm in a conventional swing type barricade is unlatched throughout most of its cycle and remains unlatched until the barricade arm is in the fully deployed position).

In one or more embodiments, the first support post 102 and/or the second support post 104 may include one or more visual indicia indicating whether the barricade arm 106 is in the retracted (e.g., stowed) position or the deployed (e.g., raised) position. In the illustrated embodiment, a front face 110, 111 of each of the first and second support posts 102, 104, respectively, includes a first light 112, 113 (e.g., a red light) configured to illuminate when the barricade arm 106 is in the deployed (e.g., raised) position and deactivate when the barricade arm 106 is in the retracted (e.g., stowed) position. Additionally, in the illustrated embodiment, the front face 110, 111 of each of the first and second support posts 102, 104, respectively, includes a second light 114, 115 (e.g., a green light) configured to illuminate when the barricade arm 106 is in the retracted (e.g., stowed) position and deactivate when the barricade arm 106 is in the deployed (e.g., raised) position. Accordingly, the lights 112, 113, 114, 115 are configured to indicate when a vehicle is permitted to pass between the first and second support posts 102, 104 and over the road plate 101, and to indicated when a vehicle is prohibited from passing between the first and second support posts 102, 104 and over the road plate 101. In one or more embodiments, the lights may be provided only on the first support post 102 or the second support post 104, or in one or more embodiments, each of the first and second support posts 102, 104 may include only one light (e.g., a red light on one of the first and second support posts 102, 104 and a green light on the other of the first and second support posts 102, 104). In one or more embodiments, the lights 112, 113, 114, 115 may be powered by any suitable power source, such as, for instance, one or more battery cells housed inside the first support post 102 and/or the second support post 104, and/or one or more solar panels on the first support post 102 and/or the second support post 104. Furthermore, in the illustrated embodiment, the front face 110, 111 of each of the first and second support posts 102, 104 includes one or more reflectors 116, 117, respectively, configured to increase the visibility of the portable barricade 100.

In the illustrated embodiment, the portable barricade 100 includes an upwardly angled ramp 118 (e.g., at least one upwardly angled plate) and a downwardly angled ramp 119 (e.g., at least one downwardly angled plate) (shown in FIG. 1B) coupled to an upper surface 120 of the road plate 101 over which vehicles are configured to pass. The barricade arm 106 is accommodated or housed in a gap between the upwardly angled ramp 118 and the downwardly angled ramp 119 when the barricade arm 106 is in the retracted position. The upwardly and downwardly angled ramps 118, 119 are configured to enable a vehicle to smoothly pass over the barricade arm 106 when the barricade arm 106 is in the retracted position.

In the illustrated embodiment, the barricade arm 106 is longitudinally offset rearward of a fore and aft center line of the first and second posts 102, 104. In the illustrated embodiment, the barricade arm 106 is closer to rear faces 121, 122, respectively, of the first and second support posts 102, 104 than to the front faces 110, 111, respectively, of the first and second support posts 102, 104 (e.g., the barricade arm 106 is proximate to the rear faces, 121, 122 respectively, of the first and second support posts 102, 104 and distal to the front faces 110, 111, respectively, of the first and second support posts 102, 104). In one or more embodiments, the barricade arm 106 is spaced apart from the rear faces 121, 122 of the support posts 102, 104 by a distance less than half the distance between the rear faces 121, 122 and the front faces 110, 111 of the support posts 102, 104. Additionally, in the illustrated embodiment, the barricade arm 106 is longitudinally offset rearward of a fore and aft center line of the road plate 101. In the illustrated embodiment, the barricade arm 106 is closer to a rear edge 123 of the road plate 101 than to a front edge 124 of the road plate 101 (e.g., the barricade arm 106 is proximate to the rear edge 123 of the road plate 101 and distal to the front edge 124 of the road plate 101). In the illustrated embodiment, the barricade arm 106 is offset in a direction in which a vehicle passes between the first and second support posts 102, 104 and over the road plate 101. As described in more detail below, the longitudinally rearward offset of the barricade arm 106 is configured to aid in rotating over (e.g., tipping over) the portable barricade 100, when contacted by a vehicle, to arrest the forward motion of the vehicle.

Figure 1B:
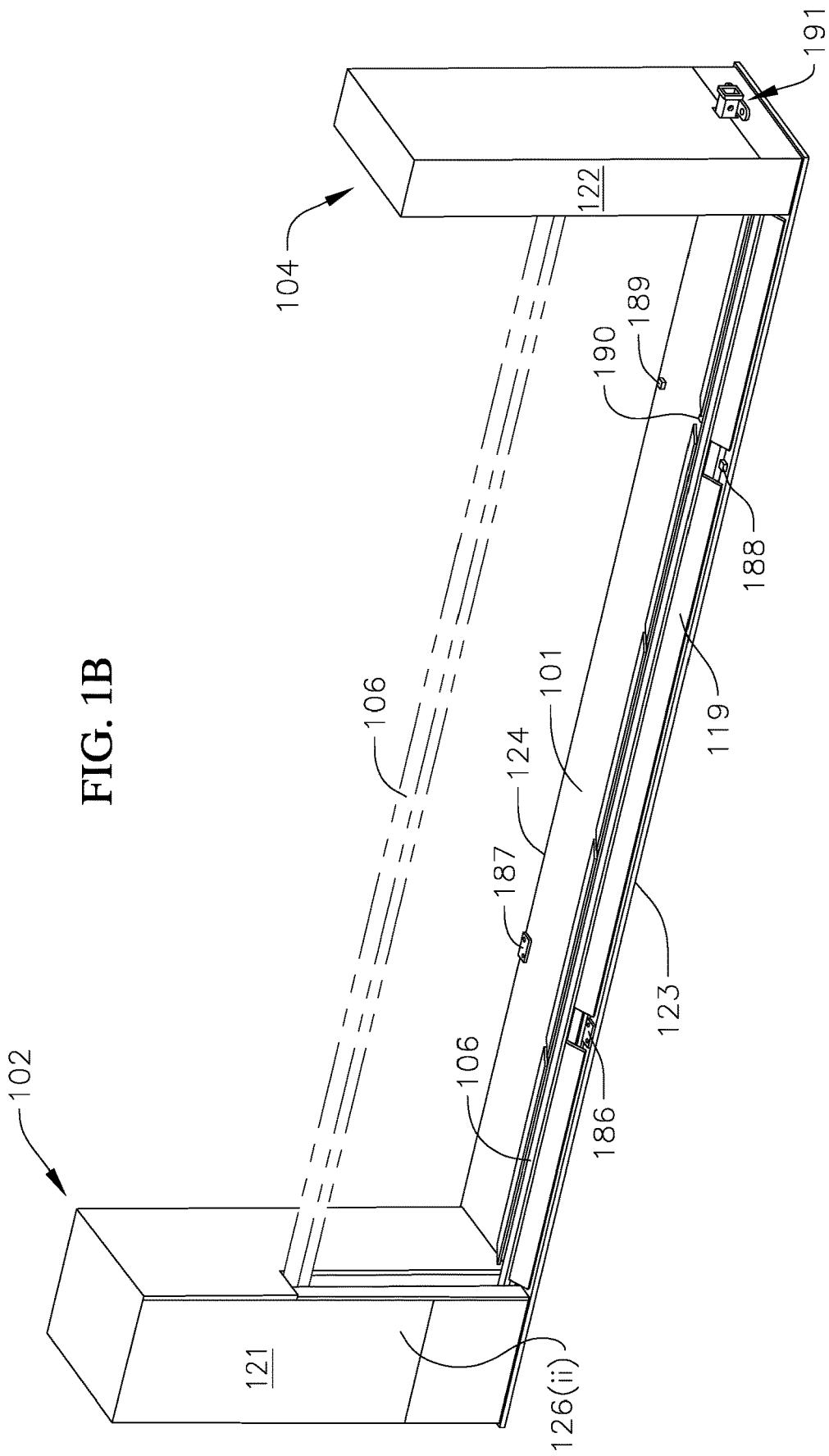
Figure 2A:
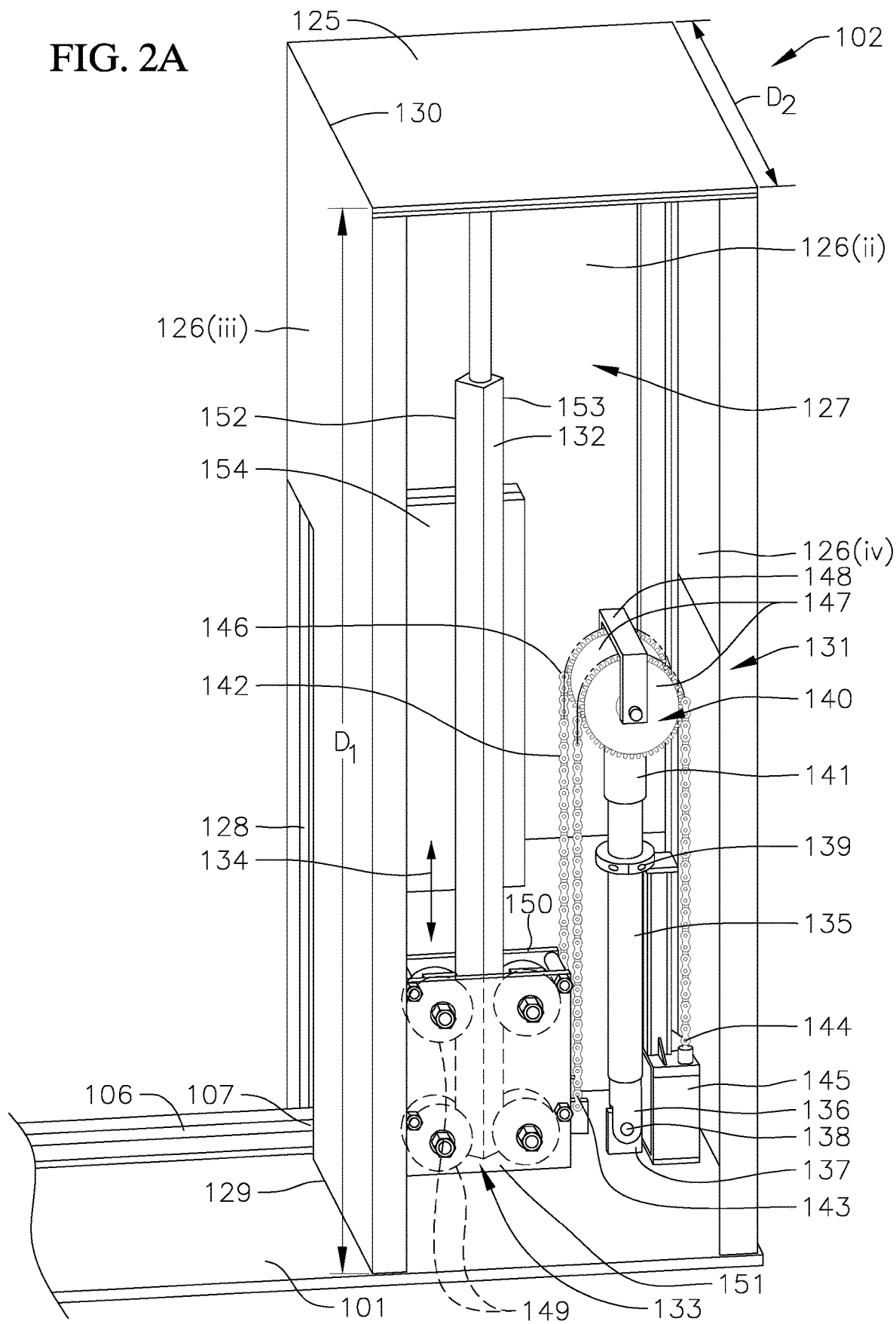
FIGS. 2A-2B are perspective views of the embodiment of the first support post illustrated in FIGS. 1A-1D, showing a lift or lifting mechanism in a retracted position and a deployed position, respectively.
Figure 2B:
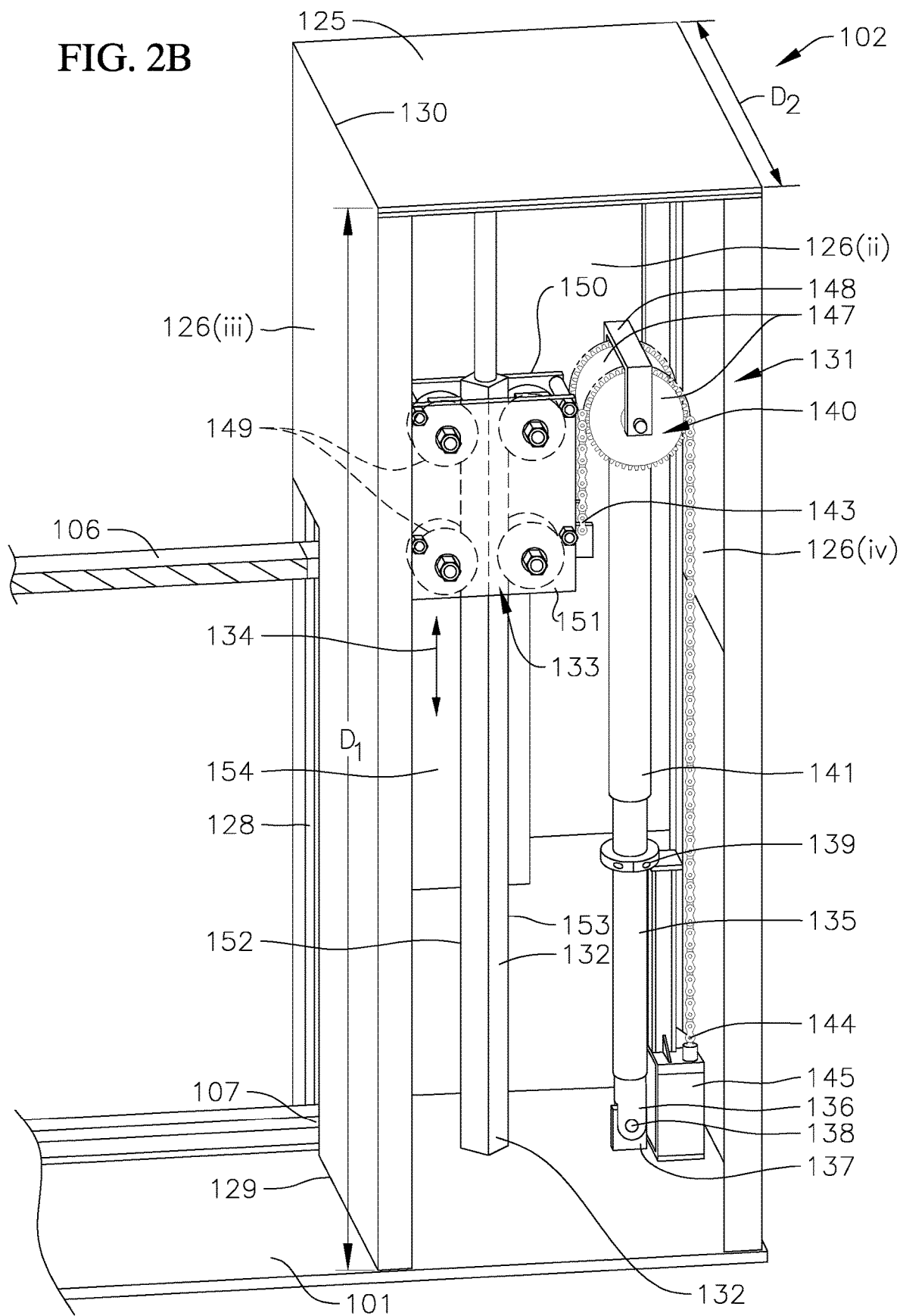

With reference now to FIGS. 2A-2B, the first support post 102 according to one embodiment of the present disclosure includes a cap wall (e.g., a top plate) 125 spaced apart from the road plate 101, and at least one sidewall 126 extending between the road plate 101 and the cap wall 125. Together, the cap wall 125, the at least one sidewall 126, and the first end portion 103 of the road plate 101 define an interior cavity or chamber 127. Additionally, in the illustrated embodiment, the at least one sidewall 126 includes four walls (e.g., a front wall 126(*i*), a rear wall 126(*ii*) spaced apart and parallel to the front wall 126(*i*), an inwardly-facing wall 126(*iii*) facing toward the second support post 104, and an outwardly-facing wall 126(*iv*) spaced apart and parallel to the inwardly-facing wall 126(*iii*) and facing away from the second support post 104). In the illustrated embodiment, the front wall 126(*i*) defines the front face 110 (see FIG. 1A) and the rear wall 126(*ii*) defines the rear face 121 (see FIG. 1B) of the first support post 102. In FIGS. 2A-2B, the front wall 126(*i*) is omitted to reveal the interior cavity 127 and the components housed therein. Although in the illustrated embodiment the at least one sidewall 126 includes four sidewalls arranged in a rectangular configuration, in one or more embodiments, the first support post 102 may include any other suitable number of sidewalls and the sidewalls may be arranged in any other suitable configuration. For instance, in one or more embodiments, the first support post 102 may include a single cylindrical sidewall. In one or more embodiments, the first support post 102 may include sidewalls arranged in any other suitable prismatic shape.

In the illustrated embodiment, the inwardly-facing wall 126(*iii*) of the first support post 102 includes an opening 128 configured to accommodate the first end portion 107 of the barricade arm 106. The opening 128 is configured to permit the barricade arm 106 to slide (arrow 108) relative to the first support post 102 between the retracted position and the deployed (e.g., raised) position. In the illustrated embodiment, the opening 128 extends upward from a lower edge 129 of the inwardly-facing wall 126(*iii*) proximate to the road plate 101 toward an upper edge 130 of the inwardly-facing wall 126(*iii*) proximate to the cap wall 125 (e.g., the opening 128 is a slot extending in a lengthwise direction of the first support post 102 from the lower edge 129 of the inwardly-facing sidewall 126(*iii*)).

In the illustrated embodiment, the portable barricade 100 also includes a lift or a lifting mechanism 131 housed in the interior cavity 127 of the first support post 102. The lifting mechanism 131 is configured to move the barricade arm 106 between the retracted position and the deployed position (e.g., the lifting mechanism 131 is configured to raise the barricade arm 106 from the retracted position to the deployed position and lower the barricade arm 106 from the deployed position to the retracted position). In one or more embodiments, the lifting mechanism 131 may be housed in the second support post 104.

In the illustrated embodiment, the lifting mechanism 131 includes a rail 132, a carriage 133 configured to slide up and down (arrow 134) along the rail 132, and an actuator 135 coupled to the carriage 133. In the illustrated embodiment, the carriage 133 is coupled to the first end portion 107 of the barricade arm 106, which extends into the interior cavity 127 through the opening 128 in the inwardly-facing sidewall 126 of the first support post 102. The carriage 133 may be coupled to the barricade arm 106 in any suitable manner, such as by a bracket and/or one or more fasteners. Actuation of the actuator 135 is configured to slide (arrow 134) the carriage 133 up along the rail 132 and thereby move the barricade arm 106 into the deployed (e.g., raised) position, and slide (arrow 134) the carriage 133 down along the rail 132 and thereby move the barricade arm 106 into the retracted (e.g., stowed) position.

In the illustrated embodiment, the actuator 135 is a cylinder (e.g., a hydraulic cylinder, a pneumatic cylinder, or an electromechanical cylinder). The cylinder may be powered by any suitable type or kind of power supply depending on the type or kind of cylinder. For instance, in one or more embodiments in which the actuator 135 is an electromechanical cylinder, the actuator 135 may be powered by one or more battery cells housed in the same support post 102, 104 as the actuator 135. In one or more embodiments in which the actuator 135 is a pneumatic cylinder, the actuator 135 may be powered by an accumulator or a compressor housed in the same support post 102, 104 as the actuator 135. In one or more embodiments in which the actuator 135 is a hydraulic cylinder, the actuator 135 may be powered by a motor, a hydraulic pump (e.g., a battery operated hydraulic pump), and a hydraulic reservoir housed in the same support post 102, 104 as the actuator 135. In the illustrated embodiment, a lower end 136 of the cylinder 135 is fixedly coupled to the road plate 101 (e.g., fixedly coupled to a bracket 137 on the road plate 101 with a cylinder connecting pin 138). Additionally, in the illustrated embodiment, the cylinder 135 extends upward in a lengthwise direction of the first support portion 102 toward the cap wall 125 (e.g., the cylinder 135 is oriented upright). In the illustrated embodiment, the lifting mechanism 131 also includes a collar 139 extending around a portion of the cylinder 135 and configured to support the cylinder 135 in the upright position. In one or more embodiments, the actuator 135 may be any device suitable for raising and lowering the barricade arm 106, such as, for instance, an electromechanical device.

Additionally, in the illustrated embodiment, the lifting mechanism 131 includes a roller 140 coupled to an upper end 141 of the cylinder 135, and a tensile member 142 having a first end 143 coupled to the carriage 133, a second end 144 opposite the first end 143 fixedly coupled to the road plate 101 (e.g., coupled to the first end portion 103 of the road plate 101 with a bracket 145), and an intermediate portion 146 extending over the roller 140. The tensile member 142 may be any suitable type or kind of flexible member configured to carry tensile loads, such as a cable, a chain, or a braided wire. The roller 140 may be any suitable type or kind of roller depending on the type or kind of tensile member 142 utilized. For instance, in the illustrated embodiment in which the tensile member 142 includes a pair of chains, the roller 140 includes a pair of spaced apart sprockets 147. Additionally, in the illustrated embodiment, the lifting mechanism 131 includes a chain guide 148 coupled to the upper end 141 of the cylinder 135 and configured to retain the chains 142 on the sprockets 147.

Additionally, in the illustrated embodiment, the rail 132 is square bar (e.g., a bar having a square cross-sectional shape). In one or more embodiments, the rail 132 may have any other suitable shape (e.g., the rail 132 may have any suitable polygonal cross-sectional shape). Additionally, in the illustrated embodiment, the carriage 133 includes four rollers 149 (e.g., wheels) arranged in a square configuration and housed between a pair of faceplates 150, 151 coupled together (e.g., with fasteners). In the illustrated embodiment, one pair of wheels 149 is configured to roll along one edge 152 of the rail 132 and the other pair of wheels 149 is configured to roll along an opposite edge 153 of the rail 132. The carriage 133 may have any other suitable configuration depending, for instance, on the configuration of the rail 132.

In the illustrated embodiment, a center of gravity of the first support post 102 is above a vertical midpoint of the first support post 102 (e.g., the center of gravity of the first support post 102 is spaced greater than half the distance $D_1$ from the cap wall 125 to the road plate 101 above the road plate 101). In one or more embodiments, the center of gravity of the first support post 102 may be longitudinally offset rearward of the fore and aft centerline of the first support post 102. That is, in one or more embodiments, the center of gravity of the first support post 102 may be offset toward the rear wall 126(ii) of the first support post 102 (e.g., the center of gravity of the first support post 102 is spaced less than half the distance $D_2$ between the front wall and the rear wall in front of the rear wall). In one or more embodiments, the center of gravity of the first support post 102 may be both above a vertical midpoint of the first support post 102 and aft of the fore and after centerline of the first support post 102. The center of gravity of the first support post 102 is configured to promote tipping over of the first support post 102 when the barricade arm 106 is struck by a vehicle which, as described in detail below, is configured to arrest the forward motion of the vehicle.

In one or more embodiments, locating the center of gravity of the second support post 102 above the vertical midpoint and/or forward of the fore and aft centerline of the first support post 102 may be achieved by attaching one or more weights proximate to the cap wall 125 and/or proximate to the rear wall 126(ii), selecting different materials for the cap wall 125 and the road plate 101 (e.g., selecting a heavier material for the cap wall 125 than the road plate 101), selecting different materials for the rear wall 126(ii) and the front wall 126(i) (e.g., selecting a heavier material for the rear wall 126(ii) than the front wall 126(i)), selecting different sizes for the cap wall 125 and the road plate 101 (e.g., selecting a thicker metal sheet for the cap wall 125 than the road plate 101), selecting different sizes for the rear wall 126(ii) and the front wall 126(i) (e.g., selecting a thicker metal sheet for the rear wall 126(ii) than the front wall 126(i)), or any suitable combination thereof, and/or any other suitable method.

In the illustrated embodiment, the first support post 102 includes one or more plates 154 (e.g., one or more steel plates having a thickness of approximately 1.25 inch) configured to elevate the center of gravity of the first support post 102 above the midpoint of the first support post 102 and/or to shift the center of gravity of the first support post 102 aft of the fore and aft centerline of the first support post 102. In the illustrated embodiment, the first support post 102 includes a pair of steel plates 154 housed in the interior cavity 127 and proximate to the rear wall 126(ii). In one or more embodiments, the one or more plates 154 may be located in any other suitable location (e.g., proximate to the cap wall 125) depending on the desired location of the center of gravity of the first support post 102.

Figure 3A:
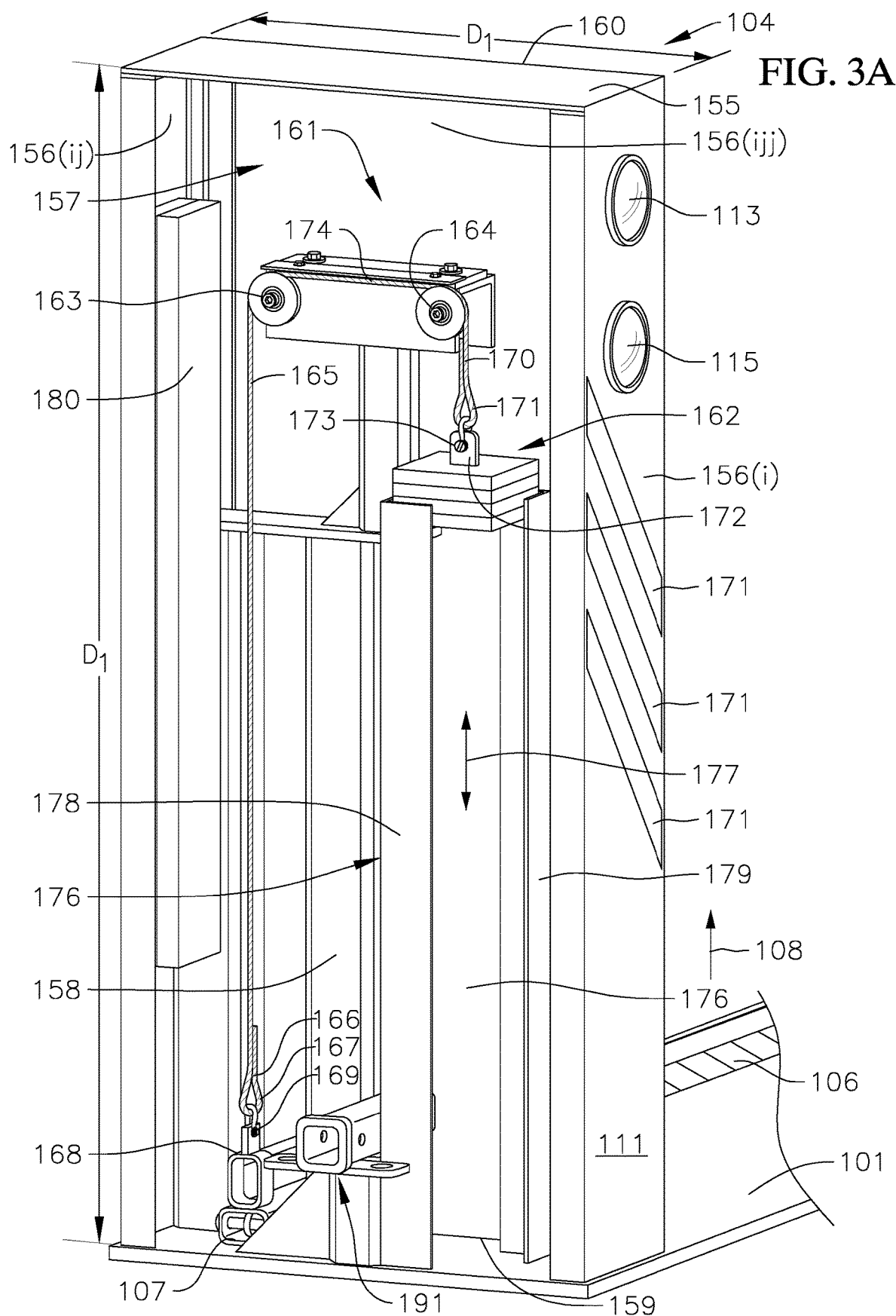
FIGS. 3A-3B are perspective views of the embodiment of the second support post illustrated in FIGS. 1A-1D, showing a counter-weight assembly in a retracted position and a deployed position, respectively.
Figure 3B:
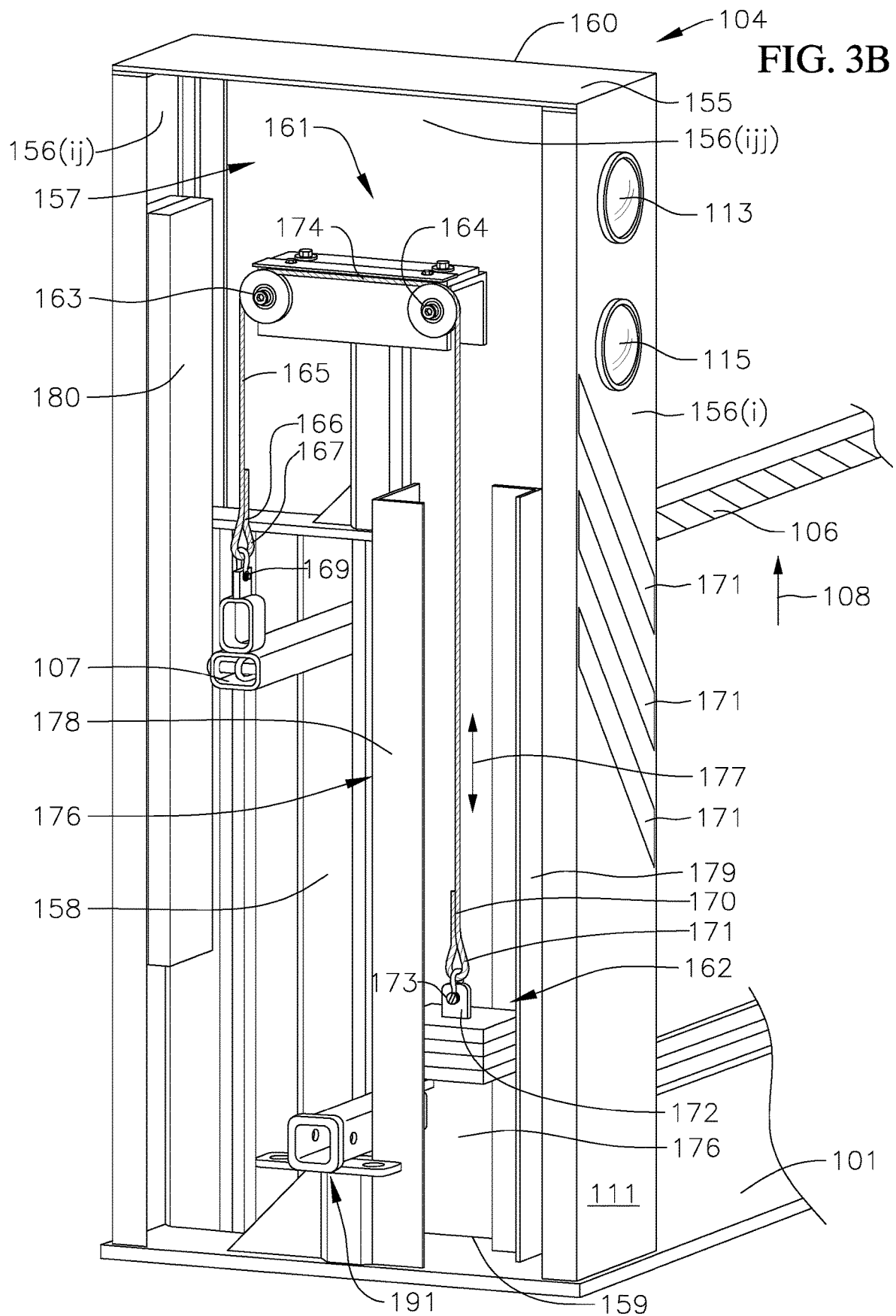

With reference now to FIGS. 3A-3B, the second support post 104 according to one embodiment of the present disclosure includes a cap wall (e.g., a top plate) 155 spaced apart from the road plate 101, and at least one sidewall 156 extending between the road plate 101 and the cap wall 155. Together, the cap wall 155, the at least one sidewall 156, and the second end portion 105 of the road plate 101 define an interior cavity or chamber 157. Additionally, in the illustrated embodiment, the at least one sidewall 156 includes four walls (e.g., a front wall 156(i), a rear wall 156(ii) spaced apart and parallel to the front wall 156(i), an inwardly-facing wall 156(iii) facing toward the first support post 102, and an outwardly-facing wall 156(iv) (shown in FIG. 1A) spaced apart and parallel to the inwardly-facing wall 156(iii) and facing away from the first support post 102). In the illustrated embodiment, the front wall 156(i) defines the front face 111 (see FIG. 1A) and the rear wall 156(ii) defines the rear face 122 (see FIG. 1A) of the second support post 104. In FIGS. 3A-3B, the outwardly-facing wall 156(iv) is omitted to reveal the interior cavity 157 and the components housed therein. Although in the illustrated embodiment the at least one sidewall 156 includes four sidewalls arranged in a rectangular configuration, in one or more embodiments, the second support post 104 may include any other suitable number of sidewalls and the sidewalls may be arranged in any other suitable configuration. For instance, in one or more embodiments, the second support post 104 may include a single cylindrical sidewall. In one or more embodiments, the second support post 104 may include sidewalls arranged in any other suitable prismatic shape.

In the illustrated embodiment, the inwardly-facing wall 156(iii) of the second support post 104 includes an opening 158 configured to accommodate the second end portion 109 of the barricade arm 106. The opening 158 is configured to permit the barricade arm 106 to slide (arrow 108) relative to the second support post 104 between the retracted position and the deployed (e.g., raised) position. In the illustrated embodiment, the opening 158 extends upward from a lower edge 159 of the inwardly-facing wall 156(iii) proximate to the road plate 101 toward an upper edge 160 of the inwardly-facing wall 156(iii) proximate to the cap wall 155 (e.g., the opening 158 is a slot extending in a lengthwise direction of the second support post 104 from the lower edge 159 of the inwardly-facing sidewall 156(iii)).

In the illustrated embodiment, the portable barricade 100 also includes a counter-weight assembly 161 housed in the interior cavity 157 of the second support post 104. The counter-weight assembly 161 is configured to aid in lifting (arrow 108) the second end portion 109 of the barricade arm 106 as the lifting mechanism 131 is actuated to lift the first end portion 107 of the barricade arm 106. In this manner, the counter-weight assembly 161 is configured to stabilize the barricade arm 106 as the lifting mechanism 131 is actuated to move the barricade arm 106 between the retracted position and the deployed position. For instance, in one or more embodiments, the counter-weight assembly 161 is configured to maintain the barricade arm 106 level or substantially level (e.g., horizontal or substantially horizontal) as the lifting mechanism 131 is actuated to raise the barricade arm 106 from the retracted position to the deployed position and to lower the barricade arm 106 from the deployed position to the retracted position.

In the illustrated embodiment, the counter-weight assembly 161 includes a counter-weight 162 (e.g., a stack of two or more counter-weights), a pair of pulleys 163, 164 coupled to the second support post 104 (e.g., the inwardly-facing wall 156(iii) of the second support post 104), and a tensile member 165 coupling the counter-weight 162 to the second end portion 109 of the barricade arm 106. In the illustrated embodiment, the tensile member 165 has a first end portion 166 coupled to the first end portion 107 of the barricade arm 106 (e.g., an eyelet 167 at the first end portion 166 of the tensile member 165 is coupled to a bracket 168 at the first end portion of the barricade arm 106 with a pin shackle 169), a second end portion 170 coupled to the counter weight 162 (e.g., an eyelet 171 at the second end portion 170 of the tensile member 165 is coupled to a bracket 172 of the counter weight 162 with a pin shackle 173, and an intermediate portion 174 passing over the pulleys 163, 164. The tensile member 165 may be any suitable type or kind of tensile member, such as, for instance, a chain, a cable, or a wire (e.g., braided wire).

Additionally, in the illustrated embodiment, the counter-weight assembly 161 includes a guide 175 defining a channel 176. The channel 176 is configured to accommodate the counter-weight 162 and the guide 175 is configured to guide the counter-weight 162 up and down (arrow 177) within the channel 176 as the barricade arm 106 moves (arrow 108) between the retracted position and the deployed position. In the illustrated embodiment, the guide 175 includes a pair of L-shaped angles 178, 179 facing toward each other, although in one or more embodiments the guide 175 may have any other suitable configuration depending, for instance, on the configuration of the counter-weight 162. In the illustrated embodiment, the L-shaped angles 178, 179 are coupled to the road plate 101 and extend upward toward the cap wall 155 of the second support post 104. Additionally, in one or more embodiments, the shape of the guide 175 is configured to conform to at least a portion of the shape of the counter-weight 162.

Although in the illustrated embodiment the lifting mechanism 131 is housed in the first support post 102 and the counter-weight assembly 161 is housed in the second support post 104, in one or more embodiments, the lifting mechanism 131 may be housed in the second support post 104 and the counter-weight assembly 161 may be housed in the first support post 102.

In the illustrated embodiment, a center of gravity of the second support post 104 is above a vertical midpoint of the second support post 104 (e.g., the center of gravity of second support post 104 is spaced greater than half the distance $D_1$ from the cap wall 155 to the road plate 101 above the road plate 101). In one or more embodiments, the center of gravity of the second support post 104 may be longitudinally offset rearward of the fore and aft centerline of the second support post 104. That is, in one or more embodiments, the center of gravity of the second support post 104 may be offset toward the rear wall 156(ii) of the second support post 104 (e.g., the center of gravity of the second support post 104 is spaced less than half the distance $D_2$ between the front wall 156(i) and the rear wall 156(ii) in front of the rear wall 156(ii)). In one or more embodiments, the center of gravity of the second support post 104 may be both above a vertical midpoint of the second support post 104 and aft of the fore and after centerline of the second support post 104. The center of gravity of the second support post 104 is configured to promote tipping over of the second support post 104 when the barricade arm 106 is struck by a vehicle which, as described in detail below, is configured to arrest the forward motion of the vehicle.

In one or more embodiments, locating the center of gravity of the second support post 104 above the vertical midpoint and/or rearward of the fore and aft centerline of the second support post 104 may be achieved by attaching one or more weights proximate to the cap wall 155 and/or proximate to the rear wall 156(ii), selecting different materials for the cap wall 155 and the road plate 101 (e.g., selecting a heavier material for the cap wall 155 than the road plate 101), selecting different materials for the rear wall 156(ii) and the front wall 156(i) (e.g., selecting a heavier material for the rear wall 156(ii) than the front wall 156(i)), selecting different sizes for the cap wall 155 and the road plate 101 (e.g., selecting a thicker metal sheet for the cap wall 155 than the road plate 101), selecting different sizes for the rear wall 156(ii) and the front wall 156(i) (e.g., selecting a thicker metal sheet for the rear wall 156(ii) than the front wall 156(i)), or any suitable combination thereof, and/or any other suitable method.

In the illustrated embodiment, the second support post 104 includes one or more plates 180 (e.g., one or more steel plates having a thickness of approximately 1.25 inch) configured to elevate the center of gravity of the second support post 104 above the midpoint of the second support post 104 and/or to shift the center of gravity of the second support post 104 aft of the fore and aft centerline of the second support post 104. In the illustrated embodiment, the second support post 104 includes a pair of steel plates 180 housed in the interior cavity 157 and proximate to the rear wall 156(ii). In one or more embodiments, the one or more plates 180 may be located in any other suitable location (e.g., proximate to the cap wall 155) depending on the desired location of the center of gravity of the second support post 104.

With reference now to FIG. 4, the barricade arm 106 according to one embodiment of the present disclosure includes a beam 181 (e.g., a tube) and a cable 182 (e.g., a 0.25 inch diameter steel cable) extending through the beam 181 and coupled to opposite ends of the beam 181. In the illustrated embodiment, the ends of the cable 182 include eyelets 183 and the cable 182 is coupled to the beam 181 with fasteners 184 extending through the eyelets 183 and corresponding openings 185 in the beam 181. Additionally, although in the illustrated embodiment the beam 181 is rectangular, in one or more embodiments the beam 181 may have any other suitable configuration (e.g., the beam 181 may cylindrical or may have any other suitable prismatic shape). In one or more embodiments, the barricade arm 106 may include only the beam 181 or only the cable 182. In one or more embodiments, the barricade arm 106 may include a rod.

Figure 5A:
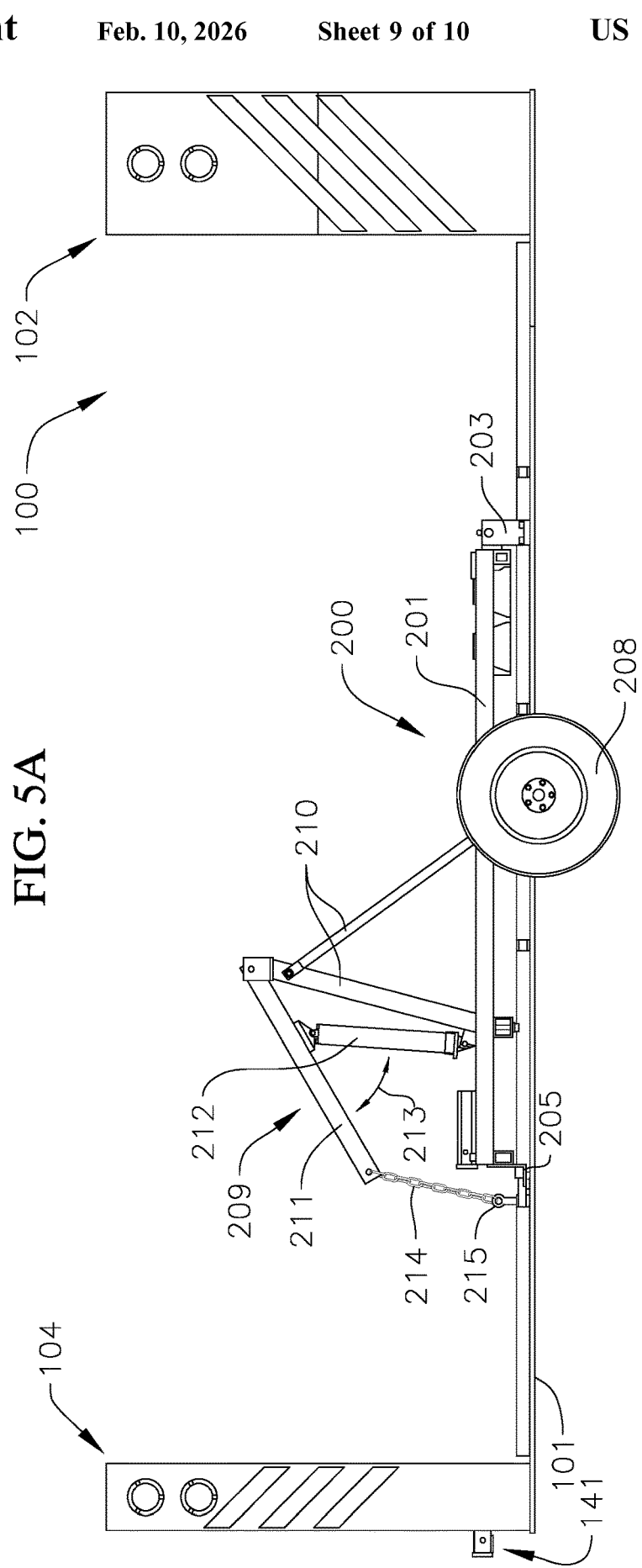
FIGS. 5A-5B are a side view and a top view, respectively, a trailer according to one embodiment of the present disclosure coupled to the embodiment of the portable barricade illustrated in FIGS. 1A-1D.
Figure 5B:
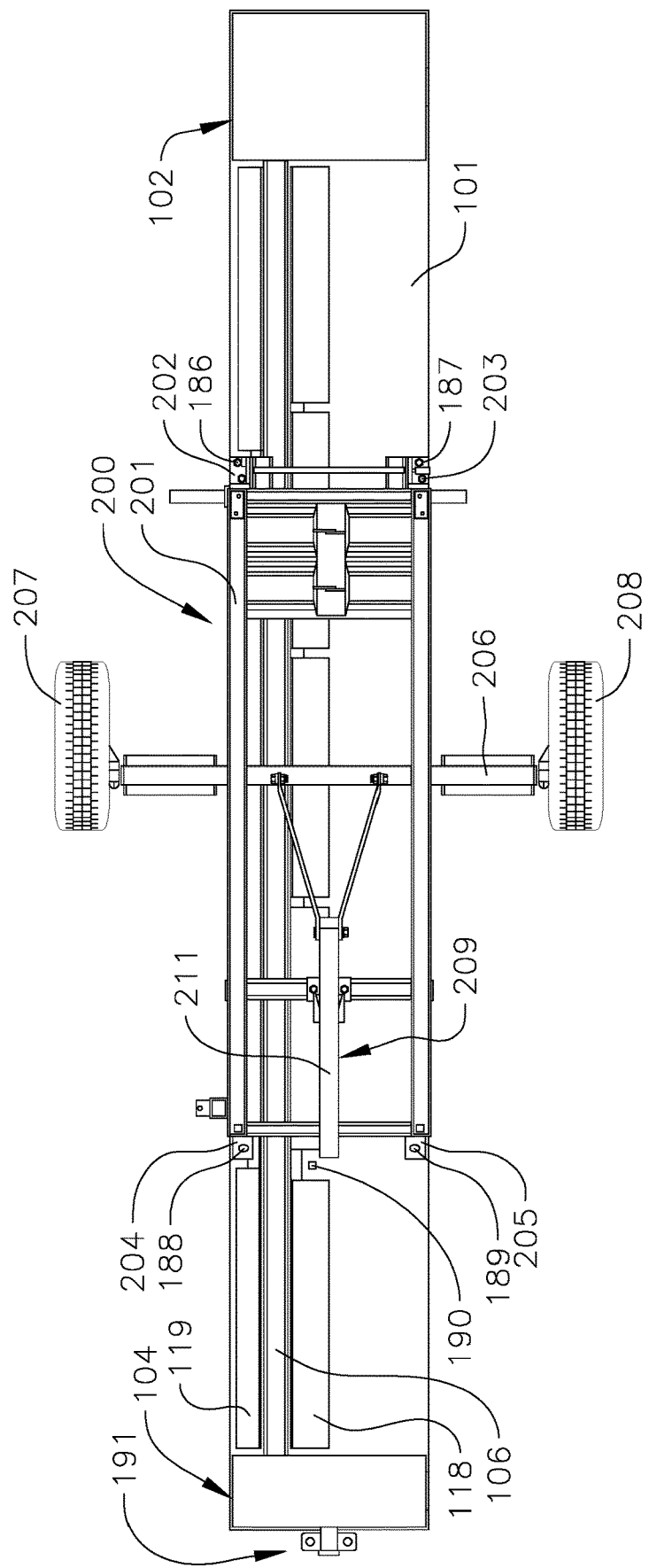

FIGS. 5A-5B depict a trailer 200 according to one embodiment of the present disclosure coupled to the portable barricade 100 to enable the portable barricade 100 to be towed by a tow vehicle.

In the illustrated embodiment, the trailer 200 includes a frame 201, a pair of rear attachment brackets 202, 203 rotatably coupled to a rear of the frame 201, and a pair of front attachment brackets 204, 205 coupled to a front of the frame 201. Additionally, in the illustrated embodiment, the trailer 200 includes an axle 206 rotatably coupled to the frame 201 and a pair of wheels and tires 207, 208 coupled to opposite ends of the axle 206.

In the illustrated embodiment, the trailer 200 also includes a hoist mechanism 209 coupled to the frame 201. As described in detail below, the hoist mechanism 209 is configured to lift the portable barricade 100 off of the ground to enable the portable barricade 100 to be coupled to the frame of the trailer 200 and then towed by a tow vehicle. In the illustrated embodiment, the hoist mechanism 209 includes at least one support member 210 (e.g., a brace), a swing arm 211 pivotally coupled to the support member 210, and an actuator 212 (e.g., a cylinder, such as a hydraulic, pneumatic, or electromechanical cylinder) having a first end (e.g., a lower end) coupled to the frame 201 and a second end (e.g., an upper end) coupled to the swing arm 211.

Actuation of the actuator 212 is configured to cause the swing arm 211 to rotate (arrow 213) relative to the at least one support member 210 (e.g., actuation of the actuator 212 is configured to raise and lower the swing arm 211).

In the illustrated embodiment, the portable barricade 100 also includes trailer attachment brackets configured to enable attachment of the trailer 200 to the portable barricade 100. In one or more embodiments, the trailer attachment brackets include a first pair of trailer attachment brackets 186, 187 coupled to the road plate 101 proximate to the first support post 102 and a second pair of trailer attachment brackets 188, 189 coupled to the road plate 101 proximate to the second support post 104, as illustrated in FIGS. 1A-1B. Additionally, in the illustrated embodiment, the portable barricade 100 also includes a hoist point 190 configured to enable lifting the portable barricade 100 off of the ground with the hoist mechanism 209 and attaching the portable barricade 100 to the trailer 200. In one or more embodiments, the hoist point 190 may be a threaded opening or insert in the road plate 101.

The portable barricade 100 may deployed in the desired location by first coupling the trailer 200 to the portable barricade 100. To couple the trailer 200 to the portable barricade 100 when the portable barricade 100 is supported on the ground, the rear of the frame 201 may be rotated downward about the axle 206 and then the pair of rear attachment brackets 202, 203 on the trailer 200 may be coupled (e.g., with fasteners) to the pair of trailer attachment brackets 186, 187 on the portable barricade 100. The pair of rear attachment brackets 202, 203 of the trailer 200 are configured to rotate relative to the frame 201 such that the pair of rear attachment brackets 202, 203 are aligned (e.g., parallel) with the road plate 101 of the portable barricade 100 when the rear of the frame 201 is tilted downward. Additionally, the swing arm 211 of the of the hoist mechanism 209 may be coupled to the hoist point 190 of the portable barricade 100, such as with a chain 214 connected to an eye bolt 215 threaded into the hoist point 190. The actuator 212 of the hoist mechanism 209 may then be actuated. As the actuator 212 is actuated, the swing arm 211 rotates (arrow 213) away from the support member 210 and lifts the portable barricade 100 off of the ground. Once the portable barricade 100 has been sufficiently lifted off of the ground such that the pair of front attachment brackets 204, 205 of the trailer 200 are aligned with the pair of attachment brackets 188, 189 on the portable barricade 100, the pair of front attachment brackets 204, 205 of the trailer 200 may then be coupled (e.g., with fasteners) to the pair of trailer attachment brackets 188, 189 on the portable barricade 100. When the portable barricade 100 is coupled to the trailer 200, the road plate 101 of the portable barricade 100 is supported off of the ground by the wheels 207, 208 of the trailer 200.

In the illustrated embodiment, the portable barricade 100 also includes a trailer hitch receiver 191 configured to be coupled to the trailer hitch of a tow vehicle. In the illustrated embodiment, the trailer hitch receiver 191 is coupled to the second support post 104, although in one or more embodiments, the trailer hitch receiver 191 may be coupled to the first support post 102. Accordingly, once the trailer 200 has been coupled to the portable barricade 100 (e.g., as described above), the hitch of the tow vehicle may be coupled to the hitch receiver 191 of the portable barricade 100 and then the portable barricade 100 may be towed to the desired location with the tow vehicle. Additionally, once the portable barricade 100 has been towed to the desired location, the trailer 200 may be detached from the portable barricade 100 (e.g., by rotating the rear end of the frame 201 downward, disconnecting the rear attachment brackets 202, 203 from the trailer attachment brackets 186, 187, disconnecting the front attachment brackets 204, 205 from the trailer attachment brackets 188, 189, actuating the actuator 212 of the hoist mechanism 209 to lower the swing arm 211 and rotate the front end of the frame 201 downward, and then disconnecting the swing arm 211 from the hoist point 190 of the portable barricade 100).

Once the portable barricade 100 has been transported with the trailer 200 to the desired location, the portable barricade 100 may be operated to prevent vehicles from passing through an area (e.g., a roadway or an entryway to a building). In operation, the actuator (e.g., the cylinder) 135 of the lifting mechanism 131 may be actuated to move the barricade arm 106 into the deployed (e.g., raised) position spaced apart from the road plate 101 to prevent vehicles from passing between the support posts 102, 104. In the illustrated embodiment, as the cylinder 135 is extended into the deployed position, the pair of sprockets 147 move upward toward the cap wall 125, which causes the sprockets 147 to rotate and move along the chains 142 toward the first ends of the chains 142 coupled to the carriage 133. The actuation of the cylinder 135 and the movement of the sprockets 147 toward the cap wall 125, pulls on the first ends of the chains 142 coupled to the carriage 133, which lifts the carriage 133 up along the rail 132 toward the cap wall 125. The movement of the carriage 133 up along the rail 132 causes the first end portion 107 of the barricade arm 106 to slid up (arrow 108) within the opening 128 in the first support post 102 away from the road plate 101. Furthermore, in one or more embodiments, as the actuator 135 of the lifting mechanism 131 is actuated to lift the first end portion 107 of the barricade arm 106, the counter-weight assembly 161 is configured to raise the second end portion 109 of barricade arm 106 such that the barricade arm 106 remains level or substantially level (e.g., horizontal or substantially horizontal) as the barricade arm 106 is moved from the retracted position to the deployed position. In one embodiment, the first lights 112, 113 (e.g., the red lights) on the first and second support posts 102, 104 may be illuminated when the barricade arm 106 is in the deployed position.

When the barricade arm 106 is in the deployed (e.g., raised) position and is struck by a vehicle (e.g., an attacking vehicle), the barricade arm 106 is configured to deform in a direction of travel of the vehicle. Additionally, when the barricade arm 106 is struck by the approaching vehicle, the portable barricade 100 is configured to rotate over (e.g., tip over). In one or more embodiments, the center of gravity of the support posts 102, 104 is above the vertical midpoints of the support posts 102, 104 and/or the center of gravity of the support posts 102, 104 is rearward of the fore and after centerlines of the support posts 102, 104, which is configured to aid in rotating the portable barricade 100 when the barricade arm 106 is contacted by the vehicle. As the portable barricade 100 rotates over, the road plate 101 rotates under the undercarriage of the vehicle and becomes lodged or trapped under the front end of the vehicle, which tends to lift the front end of the vehicle off the ground if the vehicle is traveling at a sufficiently high speed. Lifting the front end of the vehicle off of the ground redirects the momentum of the vehicle upward and thereby arrests the forward motion of the vehicle. Additionally, as the portable barricade 100 rotates over, the front edge 124 of the road plate 101 contacts various components or systems exposed along the undercarriage of the vehicle, such as the steering system, the suspension system, and/or the drivetrain system of the vehicle. The contact between the road plate 101 and the undercarriage of the vehicle is configured to disable or at least damage the vehicle, which arrests the forward motion of the vehicle. If the vehicle is sufficiently heavy and/or traveling at a sufficiently high speed, the rotation of the road plate 101 under the undercarriage of the vehicle may cause the front edge 124 of the road plate 101 to sever the drive shaft of the vehicle. The portable barricade 100 according to one or more embodiments of the present disclosure is configured to achieve certification of M30, P3 per ASTM F2656-18A testing methodology.

Additionally, in one or more embodiments, the barricade arm 106 is longitudinally offset toward the rear faces 121, 122 of the support posts 102, 104 and the rear edge 123 of the road plate 101, which allows the front wheels of the vehicle to pass over the road plate 101, or at least pass onto a rearward portion of the road plate 101, before the road plate 101 rotates over due to the contact between the vehicle and the barricade arm 106 and the weight distribution of the support posts 102, 104. Allowing the front wheels of the vehicle to pass over the road plate 101 or at least onto the rearward portion of the road plate 101 before rotating over is configured to ensure that the road plate 101 rotates under the undercarriage of the vehicle to lift and/or damage the vehicle and thereby arrest the forward motion of the vehicle. In one or more embodiments, the position of the barricade arm 106, coupled with the deformation of the barricade arm 106 due to contact with the vehicle, allows the front wheels of the vehicle to pass over the road plate 101, or at least pass onto a rearward portion of the road plate 101, before the road plate 101 rotates over. Positioning the barricade arm 106 longitudinally offset toward the rear faces 121, 122 of the support posts 102, 104 and the rear edge 123 of the road plate 101 also aids in rotating over the portable barricade 100 when the barricade arm 106 is contacted by the vehicle.

The width of the road plate 101 (i.e., the distance from the rear edge 123 to the front edge 124 of the road plate 101) may be selected to be greater than the ground clearance of the vehicles the portable barricade 100 is intended to stop.

Because the portable barricades 100 according to various embodiments of the present disclosure are configured to rotate under the vehicle to arrest the forward motion of the vehicle, the portable barricades 100 of the present disclosure are lighter than conventional barricades that rely or depend on the mass of the barricade to arrest the forward motion of the vehicle. Accordingly, the portable barricade 100 according to various embodiments of the present disclosure may be towed by a small vehicle, such as a light duty truck.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween. Additionally, as used herein, the term "mechanism" is not intended to invoke means-plus-function claiming under 35 U.S.C. § 112(f).

What is claimed is:

1. A method of arresting a forward motion of a vehicle travelling on a surface, the method comprising:
   resting a portable barricade on said surface, wherein said barricade comprises a road plate, a barricade arm having a first end portion opposite a second end portion, a first post, and a second post, wherein the barricade arm extends between the first and second posts, wherein an actuator is coupled to the first end portion of the barricade arm for providing a force only to said first end portion for moving the barricade arm between a retracted position where said first and second end portions are adjacent the road plate to a deployed position where said first and second portions are spaced apart from the road plate, and wherein a counterweight is coupled to the second end portion of the barricade arm for aiding said moving of the barricade arm between the retracted position and the deployed position, wherein the force necessary to move said barricade arm from the retracted position toward the deployed position is solely provided by said actuator and said counterweight;
   moving the barricade arm from the retracted position adjacent to the road plate to the deployed position spaced apart from the road plate, wherein moving the barricade arm comprises actuating the actuator for sliding the barricade arm along the first and second posts, and wherein when the barricade arm is in the retracted position adjacent the road plate, a vehicle may pass over the road plate and retracted barricade arm; and
   wherein when in the deployed position, contacting of said barricade arm by the moving vehicle will cause said road plate to rotate and contact an undercarriage of the vehicle during the forward motion of the vehicle, lifting at least a forward end portion of the vehicle.

2. The method of claim 1, further comprising severing a drive shaft of the vehicle by said road plate during the forward motion of the vehicle.

3. The method of claim 1, wherein the barricade arm is a solid member extending between the first and the second posts.

4. The method of claim 1, wherein one of said first end portion and second end portion of the barricade arm is coupled to a rail at the first post.

5. The method of claim 4, wherein one of said first end portion and second end portion of the barricade arm is coupled to a carriage that moves along the rail, wherein said moving of said barricade arm comprises moving said carriage along said rail.

6. The method of claim 1, wherein moving said barricade arm comprises simultaneously moving the first end portion of said barricade arm along said first post and moving a second end portion of said barricade arm opposite the first end portion along said second post.

7. The method of claim 1, wherein a lift is coupled to a first end portion of the barricade arm, wherein said lift comprises said actuator, and wherein moving the barricade arm comprises activating said lift to raise the barricade arm.

8. The method of claim 7, wherein said lift is located at the first post and wherein said counterweight is located at the second post.

9. The method of claim 1, wherein the barricade arm is an elongate member.

10. The method of claim 1, wherein the road plate is an elongate plate like member.

11. The method of claim 1, wherein during said moving of the barricade arm, the counterweight maintains the barricade arm level.

12. The method of claim 1, wherein during said moving of the barricade arm, the counterweight maintains the barricade arm substantially level.

13. The method of claim 1, wherein said actuator is located at the first post and wherein said counterweight is located at the second post.

14. The method of claim 13, wherein a counterweight is not located at the first post.

15. The method of claim 1, wherein the actuator is a hydraulic actuator.

16. The method of claim 1, wherein during moving of the barricade arm from the retracted position to the deployed position the counterweight causes said barricade arm to remain level or substantially level during said moving.

17. A method of arresting a forward motion of a vehicle travelling on a surface, the method comprising:
   resting a portable barricade on said surface, wherein said barricade comprises a road plate, a barricade arm having a first end portion opposite a second end portion, a first post, and a second post, wherein the barricade arm extends between the first and second posts, wherein an actuator is coupled to the first end portion of the barricade arm for moving the barricade arm between a retracted position where said first and second end portions are adjacent the road plate to a deployed position where said first and second portions are spaced apart from the road plate, and wherein a counterweight is coupled to the second end portion of the barricade arm for aiding said moving of the barricade arm between the retracted position and the deployed position;
   moving the barricade arm from the retracted position adjacent to the road plate to the deployed position spaced apart from the road plate, wherein moving the barricade arm comprises actuating the actuator for sliding the barricade arm along the first and second posts, and wherein when the barricade arm is in the retracted position adjacent the road plate, a vehicle may pass over the road plate and retracted barricade arm; and
   wherein when in the deployed position, contacting of said barricade arm by the moving vehicle will cause said road plate to rotate and contact an undercarriage of the vehicle during the forward motion of the vehicle, lifting at least a forward end portion of the vehicle, wherein said actuator is located at the first post, wherein said counterweight is located at the second post, and wherein a counterweight is not located at the first post.

18. A method of arresting a forward motion of a vehicle travelling on a surface, the method comprising:
   resting a portable barricade on said surface, wherein said barricade comprises a road plate, a barricade arm having a first end portion opposite a second end portion, a first post, and a second post, wherein the barricade arm extends between the first and second posts, wherein an actuator is translationally retained at the first post and is coupled to the first end portion of the barricade arm for moving the barricade arm between a retracted position where said first and second end portions are adjacent the road plate to a deployed position where said first and second portions are spaced apart from the road plate, and wherein a counterweight is coupled to the second end portion of the barricade arm for aiding said moving of the barricade arm between the retracted position and the deployed position; and moving the barricade arm from the retracted position adjacent to the road plate to the deployed position spaced apart from the road plate, wherein moving the barricade arm comprises actuating the actuator to extend providing actuating energy for sliding the barricade arm along the first and second posts from the retracted position toward the deployed position, and wherein when the barricade arm is in the retracted position adjacent the road plate, a vehicle may pass over the road plate and retracted barricade arm, wherein all actuating energy necessary for sliding the barricade arm with the aid of the counterweight is provided to the first end portion;

wherein when in the deployed position, contacting of said barricade arm by the moving vehicle will cause said road plate to rotate and contact an undercarriage of the vehicle during the forward motion of the vehicle, lifting at least a forward end portion of the vehicle.

\* \* \* \* \*